United States Patent [19]

Sampson et al.

[11] Patent Number: 5,212,639
[45] Date of Patent: May 18, 1993

[54] METHOD AND ELECTRONIC APPARATUS FOR THE CLASSIFICATION OF COMBINATORIAL DATA FOR THE SUMMARIZATION AND/OR TABULATION THEREOF

[76] Inventors: Wesley C. Sampson, 2739 Rockridge Cir. W., Toledo, Ohio 43606; Michael J. Olan, N. 4588 MeadowWood Rd., Onalaska, Wis. 54650

[21] Appl. No.: 505,061

[22] Filed: Apr. 5, 1990

[51] Int. Cl.$^5$ ............................................. G06L 15/34
[52] U.S. Cl. .................................................. 364/419
[58] Field of Search ...................................... 364/419

[56] References Cited

U.S. PATENT DOCUMENTS

| 4,346,442 | 8/1982 | Musmanno . |
| 4,506,326 | 3/1985 | Shaw et al. . |
| 4,694,397 | 9/1987 | Grant et al. . |

OTHER PUBLICATIONS

Leech, "The Theory and Development of a Matrix-Based Accounting System", Accounting and Business Research (Autumn, 1986) pp. 327-341.
Amer, Bailey and De, "A Review of the Computer. Information Systems Research Related to Accounting and Auditing", Journal of Information Systems (Fall 1987) pp. 3-28.
Martin, *Managing the Data-Base Environment*, Englewood Cliffs, New Jersey, Prentice-Hall, 1983, p. 333.
Mattesich, *Accounting and Analytical Methods*, Richard D. Irwin, Inc., 1964, p. 336.

*Primary Examiner*—Gail O. Hayes
*Attorney, Agent, or Firm*—Kent A. Herink; Brian J. Laurenzo

[57] ABSTRACT

An apparatus and a method for creating a database wherein the data entry, such as a journal entry in accounting, is the canonical record can be implemented utilizing a microcomputer. A plurality of data entries to be classified are separate records each comprised of one or more items having associated quantities and an entry number serving as a pointer to the record. Each item contains information including at least an item number or label and a quantity. At least two item indicators are then generated for each of the item numbers. A mapping function is applied to each data entry to assign the item indicators for the item numbers based upon the associated quantities. The item indicators for the data entry are sorted into ascending numerical sequence and an n-dimension sparse matrix is selected where "n" is the number of items in the data entry. If the present combination of item indicators is new, a design record is created for the database based upon the sparse matrix and including the item indicators, the associated quantity sums, the total number of data entries summarized in the design record and a pointer (a chain of entry numbers) to the records of the data entry detail. The quantities for the present data entry are added to the quantity sums and the entry number is stored in the pointer chain. After all the data entries have been processed, a search routine can be utilized to review the various design records as desired.

20 Claims, 5 Drawing Sheets

METHOD AND ELECTRONIC APPARATUS FOR THE CLASSIFICATION OF COMBINATORIAL DATA FOR THE SUMMARIZATION AND/OR TABULATION THEREOF

BACKGROUND OF THE INVENTION

The present invention relates generally to a system for classifying large volumes of raw data and, in particular, to a method and apparatus for optimally summarizing a plurality of data entries for efficient review, inspection, sorting, summarizing and reporting.

Many enterprises generate large volumes of data entries, each such entry having associated with it one or more items representing important information. Typically, larger enterprises are computerized and the data entries are inputted into a computer and then transferred to a mass storage device such as a magnetic tape for later use in various data analysis and report generating programs. For example, a receiving department or a stock room accepts a delivery of parts to be placed into inventory. At least the part number and quantity must be inputted into the computer for later use in inventory, manufacturing and accounting programs.

Various specialized computer programs have been written to organize large volumes of data entries. For example, U.S. Pat. No. 4,346,442 shows a program for processing data entries related to a securities brokerage/cash management system. In U.S. Pat. No. 4,694,397, there is shown a computer system for interfacing a banking system and a brokerage system. U.S. Pat. No. 4,506,326 discloses an apparatus and method for synthesizing a query for accessing a relational database. Of course, there are also many commercial database management programs available today. However, many specific applications have not been addressed.

For example, there appear to be few, if any, formal reports of the journal in the history of accounting. The first level of accounting data, the journal, has received little research attention. To many observers, the journal is merely a log of activity, i.e. the input data from which a ledger is derived. Other than the "debit-credit balance test" and the "does-the-account-exist test", computer systems often leave the completeness and correctness of accounting matters to auditors and accounting supervisors.

Nevertheless, journals have been an important part of auditing because the environment of accounting, internal control, is evaluated at this point. Auditors have struggled with the need for classification of the journal. They have used procedures of "read the journal" for manual systems and various scan and cross-reference techniques in computer systems. Many auditors feel that an "inspection of data" function has been lost in the volumes of data handled by computer accounting systems.

Leech, in his review of matrix accounting literature ("The Theory and Development of a Matrix-Based Accounting System", 1986), suggested that databases might overcome the problems associated with recording transactions in matrix accounting systems. Amer, Bailey and De ("A Review of the Computer Information Systems Research Related to Accounting and Auditing", 1987) reviewed computer audit literature and noted the lack of direction of research in accounting and auditing information systems. Most academic thought toward accounting-oriented databases is found in the "events accounting" literature, which seeks to expand the measurements made by accounting. The present invention involves the design and programming of a database which is expected to be useful to both the auditing and matrix schools of thought.

SUMMARY OF THE INVENTION

The present invention concerns an apparatus and a method for creating a database wherein the data entry, such as a journal entry in accounting, is the canonical record. Raw data, typically provided from a mass storage device and known as a parental set of items, is formed of one or more related data entries to be classified or summarized. Each data entry is a separate record comprised of one or more items and an entry number serving as a pointer to the record. Each item contains information including at least an item number or label and a quantity. Also provided is a list of the items to be found in the raw data including, at least, all the item numbers and the associated item descriptions in the parental set. Item indicators are then generated for each of the item numbers. For example, one indicator for positive quantities and another indicator for negative quantities, or one indicator for quantities of less than one hundred and another indicator for quantities of one hundred and more.

As each data entry is read from storage, a mapping function is applied to assign the item indicators for each of the item numbers based upon the associated quantities thereby generating an expanded parental set. An item indicator uniquely defines an item in the expanded parental set, reflects the ordinality of the item in the parental set, and identifies the use of the item in the context of the quantity. The item indicators for the data entry are sorted into ascending numerical sequence and an n-dimension sparse matrix is selected where "n" is the number of items in the data entry. If the present combination of item indicators is new, a design record is created for the database based upon the sparse matrix and including the item indicators, the associated quantity sums, the total number of data entries summarized in the design record and a pointer (a chain of entry numbers) to the records of the data entry detail. The quantities for the present data entry are added to the quantity sums and the entry number is stored in the pointer chain. After all the data entries have been processed, a search routine can be utilized to review the various design records as desired.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figures 1, 2:
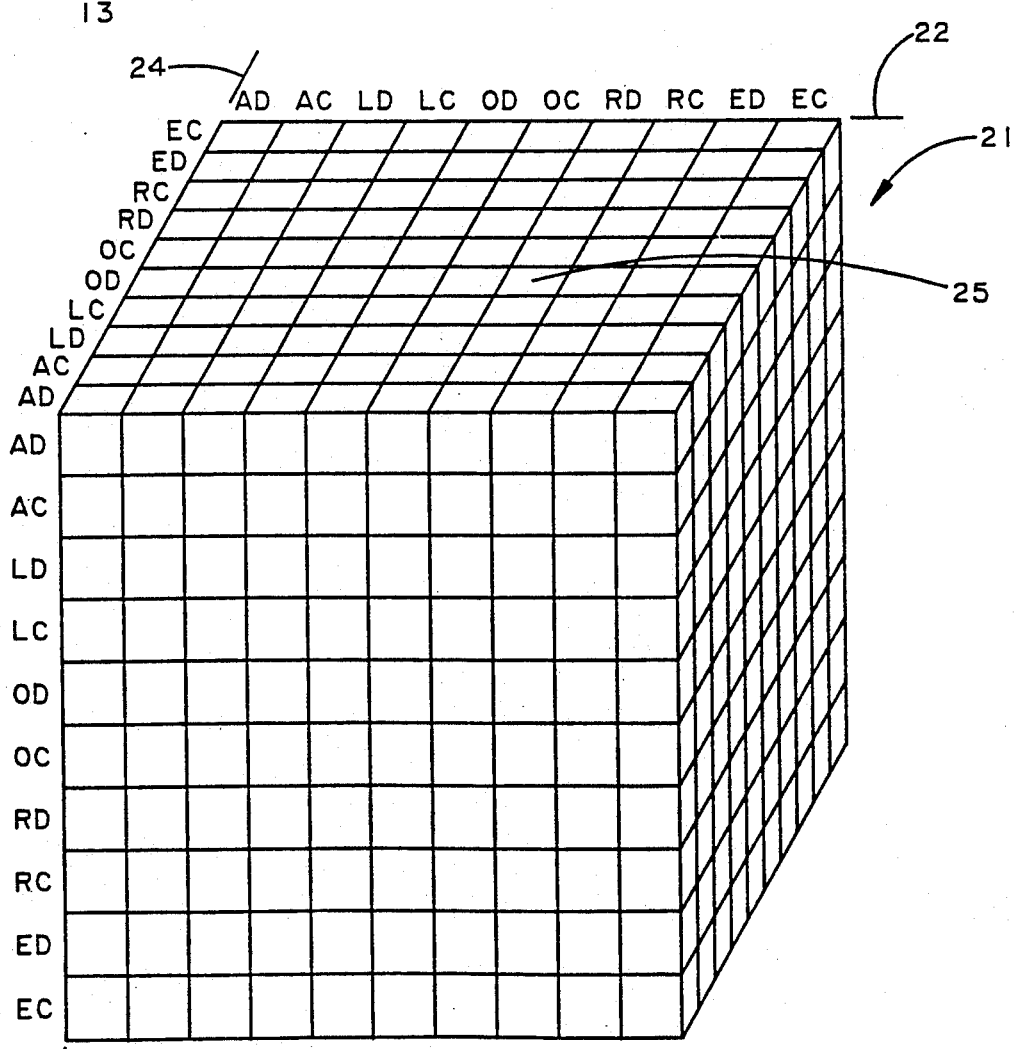
FIG. 1 is a schematic perspective view of a prior art two-dimensional accounting matrix.
FIG. 2 is a schematic perspective view of a three-dimensional accounting matrix according to the present invention.

The present invention concerns a system for classifying large volumes of raw data including a method and an apparatus for optimally summarizing a plurality of data entries for efficient review, inspection and reporting. Before describing the present invention in detail, however, the terms utilized to describe the system must be defined. Raw data, typically provided from a mass storage device, is a plurality of records of data entries each of which is formed of one or more items and an entry number. An item includes at least an item number (which can be any combination of numbers and/or letters and/or other symbols) and a quantity. For example, an item could represent a manufacturing component having an associated part number (item number) and quantity.

The plurality of data entries to be processed and classified in accordance with the present invention is known as a parental set of items. A list of items, all item numbers and associated descriptions that may be found in the parental set is utilized to generate item indicators. For example, one item indicator can represent a positive quantity of an item number and another item indicator can represent a negative quantity of the same item number. A mapping function is applied to the data entries in the parental set to assign the item indicators for each of the items resulting in an expanded parental set. An item indicator uniquely defines an associated item in the expanded parental set, reflects the ordinality of the item in the parental set and identifies the use of the item in the context of its quantity.

A specific example of a practical use for the system according to the present invention is in the field of accounting. Raw data, typically provided from a mass storage device such as a computer backup tape, can be a plurality of journal entries (data entries) each of which is formed of two or more lines (items). A line includes at least an account number (item number) and a dollar amount (quantity).

The plurality of journal entries to be processed and classified in accordance with the present invention is known as a parental set of lines. A list of all account numbers and associated descriptions, a chart of accounts, is utilized to generate account-sections (item indicators). For example, one account-section can represent a debit to an account number and another account-section can represent a credit to the same account number. A mapping function is applied to the journal entry lines in the parental set to assign the appropriate account-sections resulting in an expanded parental set. An activity is an account-section associated with a particular quantity.

Such a database which aggregates repetitious mainframe accounting journal entries in a microcomputer database will enable two improvements to the auditing process. First, a summary of journals, a report heretofore nonexistent in accounting, will aid in audit planning; second, the ability to search this report using a dedicated microcomputer is expected to add efficiency to auditing. Some change in execution of auditing is related to the use of alternate data structures because the traditional auditing logic has been to work in reverse sequence from the ledger to the journal.

The ledger and trial balance procedure of accounting is not a summary of journal entries. It is a summary of individual lines of the journal entries. Distinctions involved in the basis classification of transactions become obscured in the normal bookkeeping process. A credit sale is not precisely the same as a cash sale, yet both are normally posted to the Sales account.

Similarly, a taxable sale is not identical to a non-taxable sale. The word "design", defined above, can be used to identify the forms of journal entries. Examples of the forms of a non-taxable service sale and a taxable service sale are:

| | | |
|---|---|---|
| Debit Assets | $500 | |
| Credit Revenues | | $500 |
| | and | |
| Debit Assets | $525 | |
| Credit Liabilities | | $25 |
| Credit Revenues | | $500 |

In the system according to the present invention, all journal entries of a given design, i.e., those which contain the identical debit or credit attributes of the identical accounts, are aggregated in a database design record which contains totals for the dollar values of each summary entry as well as a tally of the number of occurrences of the particular design. This database summary of journal entries provides a basis for audit planning and a method to accumulate data for matrix-derived financial statements.

Current literature and apparent practice of computer auditing emphasize the need for real-time review of program operation, yet analytic review of accounting data is a batch process. An accounting-based approach should shift computer audit emphasis, to some extent, from audit of computer controls to audit of accounting data and controls.

Mainframe computer systems often place the journal entries into a database which is reorganized frequently for more efficient storage. Search languages, such as SQL, are available for use by accountants with some computer training. The dollar overheads of real-time systems, the tendency of mainframe systems to be slow and busy at the hours auditors wish to use them, and the need for accountants to learn a complex software system all raise the cost of computer auditing, especially by personnel trained in financial audit. Martin ("Managing the Data-Base Environment" 1983) proposed that complex on-line queries should be located on another computer system.

The database according to the present invention designed for individual accountant use would ordinarily be built from backup tapes which store all transactions of general ledger software packages in general journal form. This database should be composed of totals and counts of each design of journal entry which occurred throughout the period. Use of a specialized database will provide both innovations of new audit technique and increased efficiency in existing procedures. The primary users are expected to be corporate accounting supervisors on a daily basis and auditors in a wide variety of time frames.

Although matrices have been discussed in accounting literature since Augustus De Morgan's 5th edition of

*Elements of Arithmetic* (1864), their usefulness has been obscured until Mattesich ("Accounting and Analytical Methods" 1964) integrated computer capabilities into the discussion. However, discussions of the matrix have assumed existence of a conventional set of books and trial balances. Matrix methods appear to depend upon the substitution of two dimensions of a matrix for the debit-and-credit of bookkeeping. As such, they are best used as reporting and planning tools.

Figures 3, 4:
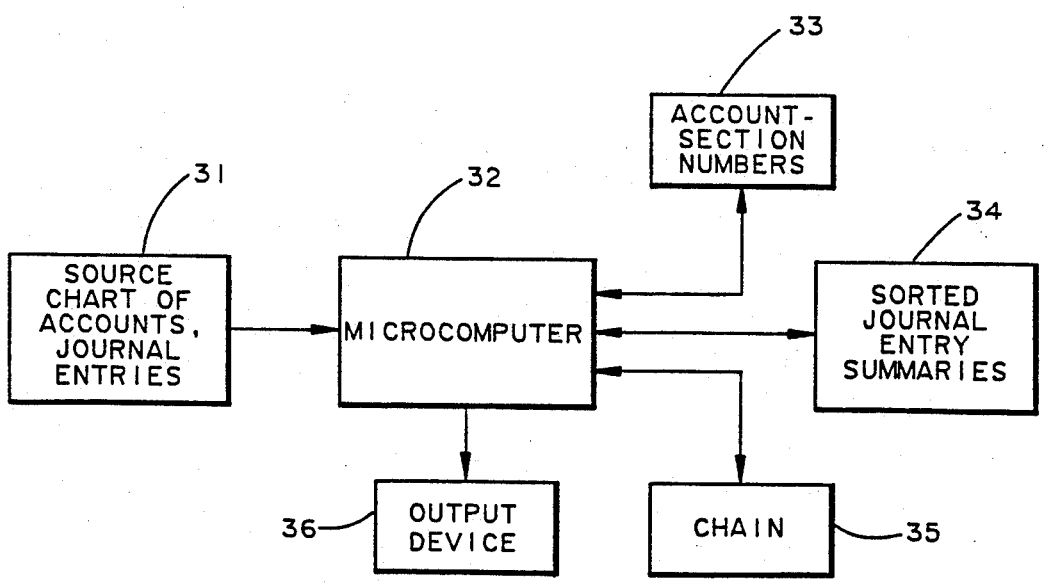
FIG. 3 is a schematic representation of the accounting journal summary data structure schema according to the present invention.
FIG. 4 is a block diagram of the apparatus according to the present invention.

The present invention brings a new approach to accounting—the aggregation of detail with emphasis upon audit. The journal entry, complete with debit and credit, is the canonical record in the present invention. Journal entries occur in varying sizes, and require variable-length records. Previous accounting database literature has emphasized the relational database model, which requires fixed length records. The following discussion, along with FIGS. 1, 2, and 3, illustrate the problem and solutions to matrix classification of journal entries.

In FIG. 1, there is shown a schematic view of a prior art two-dimensional accounting matrix. The budget model of a business firm (from Mattesich, 1964) has been compressed into the five major classifications of accounts: ASSETS, LIABILITIES, OWNERSHIP, REVENUES and EXPENSES. All account titles appear along both dimensions of a matrix 11 having an "X" axis 12 (first letter only) for Credits and a "Y" axis 13 for Debits. A $500 sale of service, requiring entries of debit ASSETS and credit REVENUES, would appear in a cell 14.

The matrix approach illustrated in FIG. 1 is envisioned to contain a master or total journal entry for each design. All journal entries which (as above) only debited assets and credited revenues would be added to the master which is schematically found in the cell 14 at the intersection of ASSETS (Debits) and REVENUES (Credits).

The journal detail of bookkeeping does not match the logic of a two-dimension matrix. Compound journal entries, those which contain more than two elements, far outnumber simple entries and they cannot be expressed in a two-dimension summary. The aggregation of journal detail requires multi-dimension matrices. Consider an entry to cash, sales, and sales tax payable which occupies one cell of a three-dimension matrix 21 as shown in FIG. 2. Not only is a three-dimension matrix needed, but provision must also be made for debit (D) and credit (C) within each account. The problem becomes more complex with larger entries.

One component of the solution is to internally assign different account numbers to the debit and credit sections of each ledger account. In other words, the chart of accounts is internally doubled to provide separate accounts for the debit and credit components of each account. This adaptation of double-entry is transparent to the accountant and allows the algorithm to classify unique, rather than paired, information for each account. Although the matrix is theoretically larger, each design occurrence of a journal entry is then unique.

Potentially, the matrix shown in FIG. 2 could hold up to one thousand values, the total number of cells. In general, an n-account journal entry will require an n-dimension matrix with up to $M^n$ values stored where "M" is two times the number of accounts in the ledger. However, there are usually relatively few journal entry designs occurring in any given matrix. This allows the use a series of sparse matrices, which require space to be allocated for only those journal entries which actually exist. Each size of journal entry, i.e., two-account, three-account, four-account, etc., requires a separate matrix. An example of a three-dimension matrix which uniquely classifies the taxable sale discussed above is shown in FIG. 2. The account designations previously used in FIG. 1 are abbreviated such as "AD" for ASSETS (Debits). The first element of the journal entry, a debit to cash, is classified on a "Y" axis 23, the credit to sales is shown on an "X" axis 22, and the sales tax payable credit appears on a "Z" axis 24 resulting in an intersection at a cell 25.

The matrix construction process involves the steps of: (a) reading a journal entry from the backup tape, (b) determining the size of the journal entry in terms of number of accounts posted, (c) adding the entry being read to totals for that design, and (d) recording the entry number in a chain for each design occurrence. The result is a total and audit detail for each unique design of journal entry.

TRANSLATION OF MULTIDIMENSION DATA TO A FLAT FILE—ACCOUNTING EXAMPLE

Although the stored journal entry summaries are abstractly described as cells of multi-dimension matrices, each matrix is implemented as a sequence of records. Indices constructed from this structure provide speedy retrieval. FIG. 3 is a schematic representation of the organization of summaries of journal entries in the database. In FIG. 3, "ACCT" represents the account-section which is the account number modified by debit or credit, "$$" is the total dollars for the corresponding account-section accumulated from all entries of identical design, "N" is the number of journal entries summarized, and "P" is a pointer to records of the journal entry detail formed as a chain of entry numbers. Each horizontal row represents a database design record for accumulating a different design. Although the term "account number" has been used above, any suitable account indicator symbol can be utilized with the present invention.

The complete detail of smaller journals can be stored in entry number sequence for retrieval of detail. At some point, the volume of journal data of larger companies will require that only the entry numbers may be available for retrieval. In those larger firms, a search of files of the mainframe computer is required to retrieve the details of the entries.

The classification of journal entries as shown in FIG. 3 and described above is a new report in accounting. Its utility is in audit planning and internal control evaluation resulting in improvement in the following aspects of auditing: 1) search for exceptional entries; 2) search for exceptional dollar amounts; 3) evaluation of departmental controls; and 4) support for other internal control evaluation methods.

Exceptional entries are likely to be less understood and may indicate weakness in supervision. The round number search helps find estimates to be audited. Round number entries are possibly estimates, and U.S. auditors are required to audit accounting estimates.

One can ask such questions of each summary (as in FIG. 3) as "What entries occurred once?" or "What entry summaries have all dollar amounts evenly divisible by x?". This proposed analysis of the journal for unusual entries adds a degree of analytic review to the study of internal control which was previously unavailable in a formal manner.

Concentration on those entries which occur few times provides for accounting data management by exception. Once the designs of few occurrences are identified, the supervisor or auditor has indications of where exceptions may exist. Conversely, exact counts of frequent transactions enable statistical sampling to be directed to specific purpose.

Logically, similar journal entries should arise from similar departments. A classification scheme of journal entries allows a supervisor or an auditor to inspect this condition after the fact. The query, "What are the entries which affect this group of accounts?" allows one to gather all recorded accounting entries created by a department.

Databases on mainframe systems are currently available to auditors. There is frequent continuing education on how auditors may access these databases through mainframe terminals, as well as remotely through telecommunications. Thus, an independent accounting oriented microcomputer database according to the present invention should be easy to learn and to operate.

Traditional audit of internal control matches postings to given accounts with source documents. The emphasis upon known dollar totals and counts of journal entries of a given transaction type and/or department allows better planning for examination of the underlying documents or computer-generated entries. Tests may be made on the basis of entry design more than on the basis of posting to a particular account.

An auditor is interested in related accounts and related transactions. The "other end" of the journal entry is available with every search when using a journal database. This allows the auditor to expand a search at any time. A traditional ledger search can be inefficient on two counts: first, some ledger postings are highly repetitious because some transactions occur frequently; second, once a posting is found, the "other end" of the transaction needs to be identified to complete the analysis.

Searching two accounts at the same time is a rapid search once the entries have been summarized. One may ask the system "Are there any entries which affect these two accounts and some others?". The search for variations beyond two (or more) accounts fits traditional audit practice. For example, auditors examine repairs and equipment additions concurrently. The user can also "sweep" groups of consecutive accounts for combinations of account numbers, such as entries which contain both credits to maintenance accounts and debits to assets. The search for unlikely combinations aids in the evaluation of internal control because it allows focus on possible areas of management override of internal control.

Traditional queries, such as "What are the debits to the Sales account?" are expected to be more efficiently answered in a specialized database according to the present invention than in the general-purpose databases found in major accounting packages. Reports which are based on transactions, such as the direct method of presenting cash flows, appear to lend themselves to data prepared directly from journal entries.

An effective manual audit or supervisory procedure, "read the journal", can be restored via a microcomputer database. This classification and summary of journal entries into a specialized database restores a classical tool to the auditor and enables audit searches independent of the mainframe computer. Analytic review of internal control and improved selection of transactions for testing can be expected from a classification of the journal.

An additional benefit of a journal entry database may be found in research on matrix methods. Previous research has indicated that aggregation of detail has been a barrier to development of matrix accounting systems. The multi-dimension matrix of journal totals may aid experimenters in matrix accounting.

OUTLINE OF COMPUTER PROGRAM DESIGN

In FIG. 4, there is shown an apparatus for performing the method with respect to accounting data in accordance with the present invention. A source of information or data 31, such as a mainframe computer or a computer tape on a tape drive, provides a listing of a chart of accounts and all of the journal entries to be summarized. The source 31 is connected to an input of a microcomputer 32. The microcomputer 32 reads the chart of accounts and creates separate account-section numbers representing debit and credit entries for each account. The microcomputer is connected to a storage or memory device 33 for storing the account-section numbers created from the chart of accounts. Once the account-section numbers have been stored, the microcomputer 32 does not have to read the chart of accounts each time additional related raw data is to be processed.

The microcomputer 32 reads the journal entries from the data source 31. The microcomputer 32 assigns one of the account-section numbers to each debit and credit associated with an account number in each journal entry. The assigned account-sections are sorted into ascending account-section numerical order for each journal entry. Now the microcomputer 32 can identify the design, the unique set of account-sections associated with a journal entry. The sparse matrix size is determined based upon the number of account-sections associated with the journal entry. If the design is new, the appropriate design record is created. If a journal entry of the same design has been processed previously, the corresponding design record already exists in a memory 34 connected to the microcomputer. The microcomputer 32 adds the dollar amounts of each account-section of the current journal entry into the associated design record, adds one to the number of journal entries stored in the record and updates the record pointer by storing the entry number for the journal entry in a chain.

As stated above, if the memory capacity is available, the journal entries can be stored, in a memory 35 connected to the microcomputer 32, in the order defined by the chain of each design record or simply by entry number. Thus, the journal entries are readily available to the microcomputer for inspection when desired. If the memory capacity is inadequate, the entry numbers are available to permit a search of the mainframe memory or the backup tapes for the required journal entry records. The microcomputer 32 also has an output connected to an output device 36, such as a video display terminal or a printer, for displaying information such as the data and reports.

The hardware required to implement the apparatus shown in FIG. 4 is modest. The data source 31 can be a magnetic tape reader for reading the backup tapes from a mainframe accounting data processor. The memories 33, 34 and 35 can be separate memories or a large disk storage device interfaced with the microcomputer 32. A programming language with dynamic allocation capabilities such as Pascal, Modula-2 and C can be utilized. The apparatus shown in FIG. 4 also can be used to perform the method according to the present invention on other types of data. In general terms, the chart of accounts can be a list of item numbers and associated descriptions, the journal entries can be data entries, and the account-section numbers can be item indicators.

Figure 6:
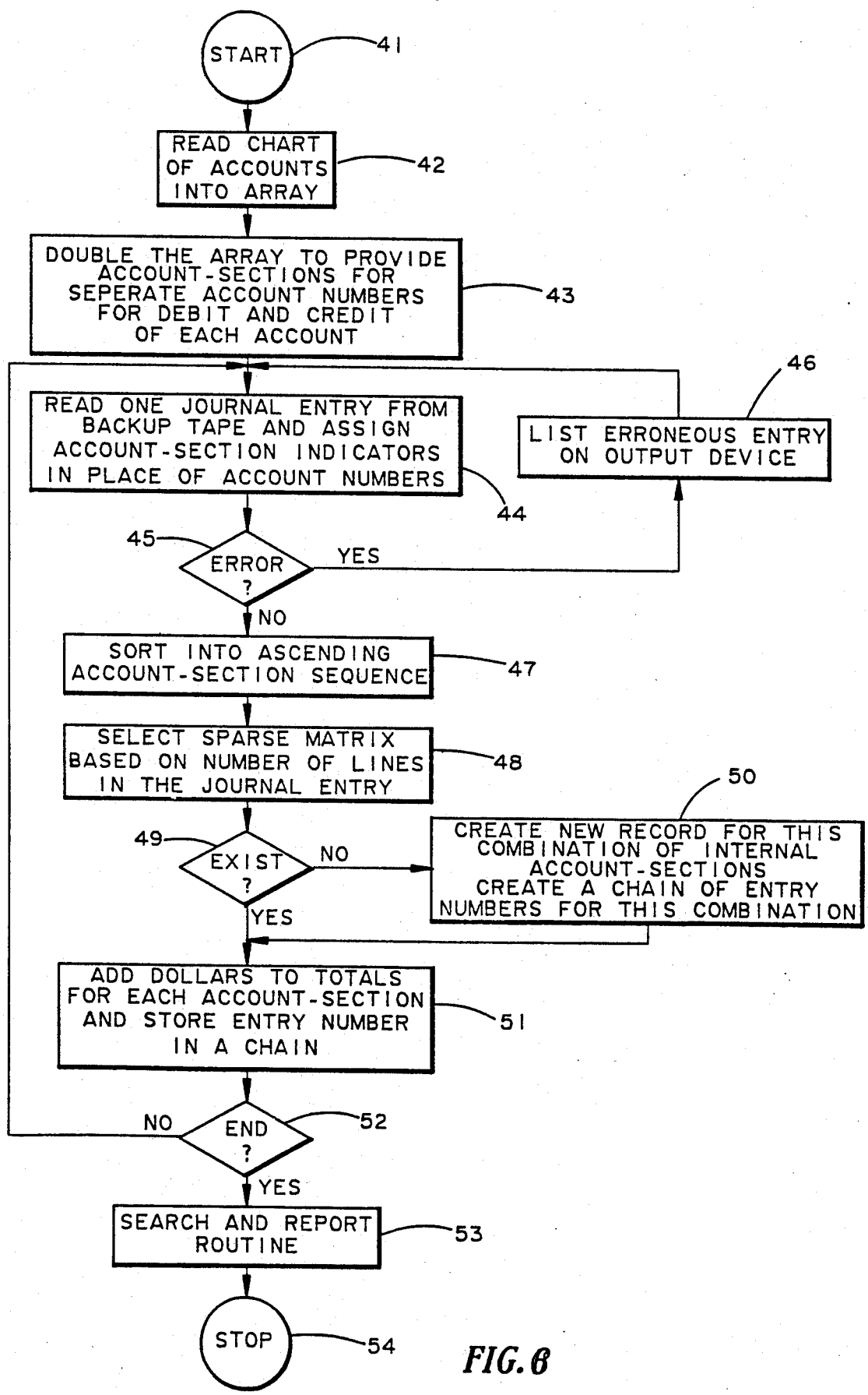
FIG. 6 is a flow diagram of the method according to the present invention applied to accounting journal entries.

A flow diagram of the method according to the present invention for summarizing accounting journal entries is shown in FIG. 6. The microcomputer 32 of FIG. 4 is programmed to perform a set of instructions starting at a circle 41. The microcomputer 32 enters an instruction set 42 which causes it to read a chart of accounts, related to the journal entries to be summarized, from the data source 31 into an array. The program then enters an instruction set 43 which creates and stores account-section numbers by doubling the array. This process is typically implemented by adding separate designations for debit and credit to the account numbers from the chart of accounts.

Figure 5:
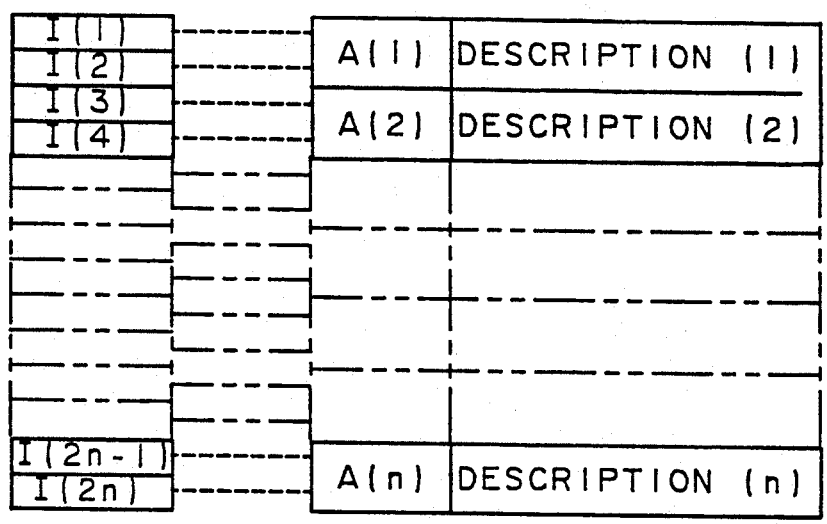
FIG. 5 is a schematic representation of an array of item indicators according to the present invention.

A schematic representation of an array of item indicators for our accounting example is shown in FIG. 5. The chart of accounts for the parental set of lines includes an account number, A(1) through A(n), each with an associated account description, DESCRIPTION (1) through DESCRIPTION (n). An account-section number I(1) is assigned to a debit for account number A(1) and a separate account-section number I(2) is assigned to a credit for the same account number. Thus, account-section numbers I(1) through I(2n) are created.

The program then enters an instruction set 44 wherein the microcomputer 32 reads a journal entry from the parental set in the data source 31 and assigns corresponding account-section numbers to each of the account numbers associated with this journal entry. The program enters a decision point 45 which is designed to detect any errors which may have been made in the assignment of the account-section numbers. If an error is detected, the program branches at "YES" to an instruction set 46 to list the erroneous entry on the output device 36 shown in FIG. 4. If no error is detected, the program branches at "NO" to an instruction set 47 where it sorts the assigned account-section numbers into ascending numerical order.

As the next step in the program, an instruction set 48 is entered wherein a multi-dimensional sparse matrix is selected based upon the number of accounts posted in the journal entry. The program then enters a decision point 49 to check whether this combination of account-sections or design has had a record created for any previous journal entries. If the combination of account-sections does not exist, the program branches from the decision point 49 at "NO" to an instruction set 50. The program creates a new record and creates a chain of entry numbers for this combination. The program then enters an instruction set 51.

If the combination exists, the program branches from the decision point 49 at "YES" to the instruction set 51. The program adds the dollar amounts associated with the account-sections of the journal entry to any previous totals and stores the entry numbers in a chain. The program then enters a decision point 52 which checks to determine whether the end of the data available from the data source 31 has been reached.

Figure 7:
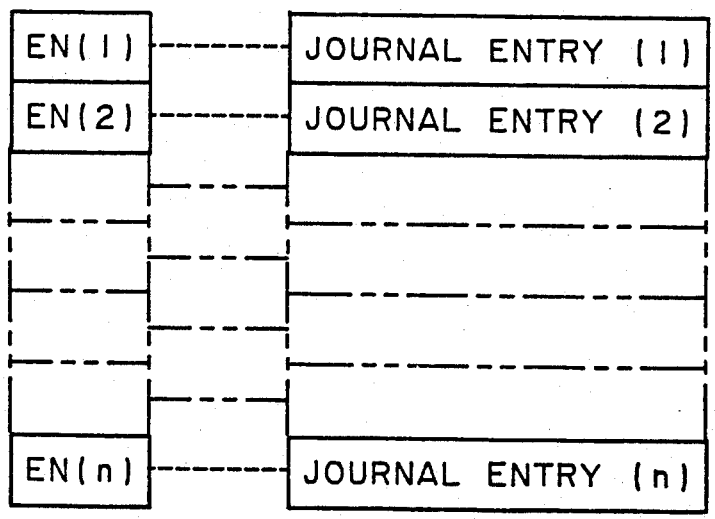
FIG. 7 is a schematic representation of a chain of item indicators according to the present invention.

In FIG. 7, there is shown a schematic representation of a chain of entry numbers, EN(1) through EN(n), identifying the original journal entries, JOURNAL ENTRY (1) through JOURNAL ENTRY (n), which share a unique design. The chain serves as the pointer "P" in each of the records shown in FIG. 3.

In FIG. 6, if all the journal entries have been read from the data source 31, the program branches from the decision point 52 at "YES" to an instruction set 53 where the program begins a search and report routine as discussed above. If all the journal entries have not been read, the program branches from the decision point 49 at "NO" and returns to the instruction set 44 to read the next journal entry. After the search routine has been completed, the program enters a circle 54 and stops.

Of course, the present invention has many applications other than for summarizing journal entries. For example, in a manufacturing enterprise, orders to build various assemblies are received which assemblies can each include a large number of different components some of which can be common to two or more of the assemblies. In order to plan for the efficient manufacturing and shipping of the assemblies, it must be determined whether the components are in inventory or must be ordered, and the flow of the components from receiving to inventory to manufacturing to shipping must be tracked.

Typically, each assembly has a part number. Associated with the assembly part number is a list of part numbers and the quantity for each of the components utilized to build the assembly. Thus, a data entry for a manufacturing order would include the assembly part number and quantity and the list of component part numbers and associated quantities. Similar data is generated for the manufacturing schedule and the shipping schedule. The accounting department requires similar data including the costs of the component parts for generating various reports and the selling price for billing purposes. Thus, a large volume of data is quickly generated for each order and, typically, each department accesses that portion of the data which it requires for use in its special software.

Figure 8:
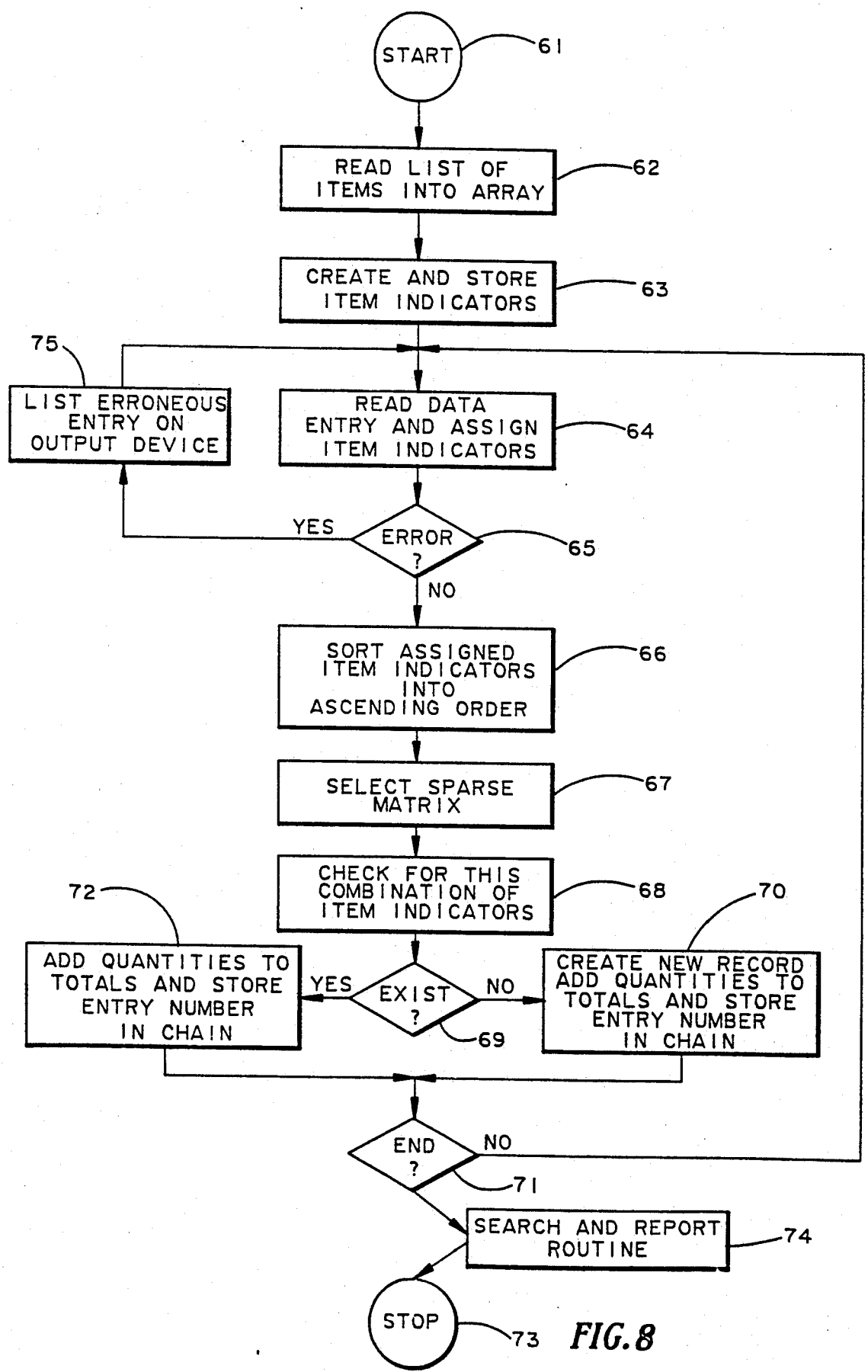
FIG. 8 is a flow diagram of the general method according to the present invention.

The present invention can be utilized to classify and summarize the above described manufacturing data as well as other parental sets of items. A flow diagram of the method according to the present invention for summarizing data entries is shown in FIG. 8. The microcomputer 32 of FIG. 4 is programmed to perform a set of instructions starting at a circle 61. The microcomputer 32 enters an instruction set 62 which causes it to read a list of items, related to the data entries to be summarized, from the data source 31 into an array. The program then enters an instruction set 63 which creates and stores item indicators. As explained above with respect to the account-sections, the item indicators can be created by multiplying the size of the array by an integer representing the number of types of quantities to be summarized. For example, if positive and negative quantities are to be summarized, the size of the array is doubled. This process is typically implemented by adding separate designations for positive and negative to the item numbers from the list of items.

The program then enters an instruction set 64 wherein the microcomputer 32 reads a data entry from the parental set in the data source 31 and assigns corresponding item indicators to each of the item numbers associated with this data entry by, for example, applying a mapping function to the items. The program enters an instruction set 65 which is designed to detect any errors which may have been made in the assignment of the account-section numbers. If an error is detected, the program branches at "YES" to an instruction set 75 to list the erroneous entry on the output device 36 shown in FIG. 4. If no error is detected, the program enters an instruction set 66 where it sorts the assigned item indicators into ascending numerical order.

As the next step in the program, an instruction set 67 is entered wherein a multi-dimensional sparse matrix is selected based upon the number of items in the data entry. The program then enters an instruction set 68 to check the memory 34 for whether this combination of item indicators or design has had a design record created for any previous data entries. If the combination of item indicators does not exist, the program branches from a decision point 69 at "NO" to an instruction set 70. The program creates a new design record and enters the quantities to start the totals and the entry number to the chain for this combination. The program stores the new design record in the memory 34 and then enters a decision point 71.

If the combination exists in the memory 34, the program branches from the decision point 69 at "YES" to an instruction set 72. The program adds the quantities associated with the item indicators of the data entry to any previous totals and stores the entry number in a chain. The program then enters a decision point 71 which checks to determine whether the end of the data available from the data source 31 has been reached.

If all the data entries have been read from the data source 31, the program branches from the decision point 71 at "YES" to a circle 73 and stops. If all the data entries have not been read, the program branches from the decision point 71 at "NO" and returns to the instruction set 64 to read the next data entry. Prior to the circle 73, the program could enter an instruction set 74 similar to the instruction set 53 in FIG. 6 where the program begins a search and report routine as discussed above.

In summary, the present invention concerns a method of and an apparatus for summarizing a plurality of data entries forming a parental set of items. The method comprises the steps of creating item indicators for each item in a list of items which may be in a parental set of items; reading an item from a parental set of items and applying a mapping function to the item to assign the corresponding ones of the item indicators to the item; sorting the item indicators assigned to the item into a predetermined order, typically ascending numerical order; identifying a design corresponding to the item; and checking stored design records for a record associated with the design and creating a record for the design if no such record exists. Once the appropriate design record has been found or created, the method steps include accumulating a quantity for each item indicator of the item in the record, adding one to a sum representing the number of items accumulated in the record, and adding an entry number to a pointer for the record, and repeating the method starting with the reading step for each data entry in the parental set. The method can be performed by a programmed microcomputer reading the data entries from a storage device and carrying out the steps of the method.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for electronically classifying a plurality of data entries each having at least one item forming a parental set of items comprising the steps of:
    a. creating item indicators for each item in a list of items which may be in a parental set of items;
    b. reading a data entry from a parental set of items and applying a mapping function to said data entry to assign corresponding ones of said item indicators to items of said data entry;
    c. sorting said item indicators assigned to said items of said data entry into a predetermined order;
    d. identifying a design corresponding to said predetermined order of said items;
    e. checking stored design records for a record associated with said design and creating a design record for said design if no such record exists;
    f. accumulating a quantity for each said item indicator of said data entry in said design record, adding one to a sum representing the number of data entries accumulated in said design record, and adding an entry number to a pointer for said design record; and
    g. repeating steps b through f for each data entry in said parental set.

2. The method according to claim 1 wherein said step a is performed by reading said list of items into an array and doubling said array to create two of said item indicators for each said item.

3. The method according to claim 1 wherein said step b is performed by said mapping function assigning said item indicators based upon an item number and a quantity associated with each of said items of said data entry.

4. The method according to claim 1 including a step of checking said data entry for errors after said step b.

5. The method according to claim 1 wherein said item indicators are numerical and said step c is performed by sorting said item indicators assigned to said items of said data entry into ascending numerical order.

6. The method according to claim 1 wherein if no such record exists, said step e includes identifying an n-dimension sparse matrix where "n" is the number of said item indicators associated with said data entry and forming a design record based upon said sparse matrix.

7. The method according to claim 1 wherein said step f is performed by adding said entry number to a chain of entry numbers to create said pointer.

8. A method for electronically summarizing accounting journal entries each having at least two lines based upon a chart of accounts comprising the steps of:
    a. reading a predetermined chart of accounts associated with a plurality of journal entries including an account number associated with each said account;
    b. creating separate account-section numbers for debit and credit for each said account number;
    c. reading one of said plurality of journal entries and assigning one of said account-section numbers to each account number in an associated line of said one journal entry to reflect debits and credits;
    d. sorting said assigned account-section numbers into ascending account-section numerical order;
    e. selecting a sparse matrix corresponding to the number of account-section numbers associated with said one journal entry;
    f. creating a new design record from said sparse matrix if a record of the design of said account-section numbers associated with said one journal entry does not exist;

g. adding a dollar amount from said one journal entry to a total for an associated account-section number in a design record corresponding to said one journal entry and storing an entry number related to said one journal entry in a chain; and h. repeating steps c through g for each said journal entry of said parental set to create a summary of said journal entries.

9. The method according to claim 8 wherein said steps a and b are performed by reading said chart of accounts into an array and doubling said array to create two of said account-section numbers for each said account number.

10. The method according to claim 8 wherein said step c is performed by applying a mapping function to said one journal entry to assign said account-section numbers based upon an account number and a dollar amount associated with each of said lines of said one journal entry.

11. The method according to claim 8 including a step of checking said one journal entry for errors after said step c.

12. The method according to claim 8 wherein said step f includes identifying an n-dimension sparse matrix where "n" is the number of said account-section numbers associated with said one journal entry and forming a design record based upon said sparse matrix.

13. The method according to claim 8 wherein said step g includes adding said entry number to a chain of entry numbers to create a pointer.

14. An apparatus for classifying a plurality of data entries, each data entry having at least one item with an item number and an associated quantity, the items defining a parental set of items, comprising:

a data processing means having a data input adapted to be connected to a source of data including a plurality of data entries forming a parental set of items;

means for storing item indicators including at least one different item indicator for each item number in a list of items in said parental set connected to said data processing means;

said data processing means including means for reading said data entries from said source of data and assigning a corresponding one of said item indicators to each item in each of said data entries;

means connected to said data processing means for storing a plurality of design records, each said record being associated with a different design data entry, said data processing means adding quantities from each of said data entries into one of said design records corresponding to the design of each said data entry; and means for storing a chain connected to said data processing means for storing an entry number for each said data entry read in a chain to create a summary of said data entries.

15. The apparatus according to claim 14 including an output device connected to said data processing means for displaying information based upon said data entries.

16. An apparatus for summarizing a plurality of accounting journal entries, each journal entry having at least two lines with an account number and an associated dollar amount, the lines defining a parental set of lines, comprising:

a data processing means having a data input adapted to be connected to a source of information including a plurality of journal entries forming a parental set of lines;

means for storing account-section numbers for debit and credit dollar amounts for each account number in a chart of accounts in said parental set connected to said data processing means;

said data processing means including means for reading said journal entries from said source of information and assigning a corresponding one of said account-section numbers to each line in each of said journal entries; and means connected to said data processing means for storing a plurality of design records, each said record being associated with a different design journal entry, said data processing means adding dollar amounts from each of said journal entries into one of said design records corresponding to the design of each said journal entry.

17. The apparatus according to claim 16 including an output device connected to said data processing means for displaying information based upon said journal entries.

18. The apparatus according to claim 16 wherein said data processing means includes means for sorting said account-section numbers for each said journal entry into ascending numerical order.

19. The apparatus according to claim 16 wherein said data processing means includes means for selecting a sparse matrix of a dimension corresponding to the number of said account-section numbers in one of said journal entries and creating a design record based upon said sparse matrix and said account-section numbers.

20. The apparatus according to claim 16 including means for storing a chain connected to said data processing means for storing an entry number for each said journal entry read in a chain to create a summary of said journal entries.

* * * * *